F. DRAKE.
REMOVABLE TRAP TEETH.
APPLICATION FILED MAR. 15, 1912.
1,052,326.
Patented Feb. 4, 1913.
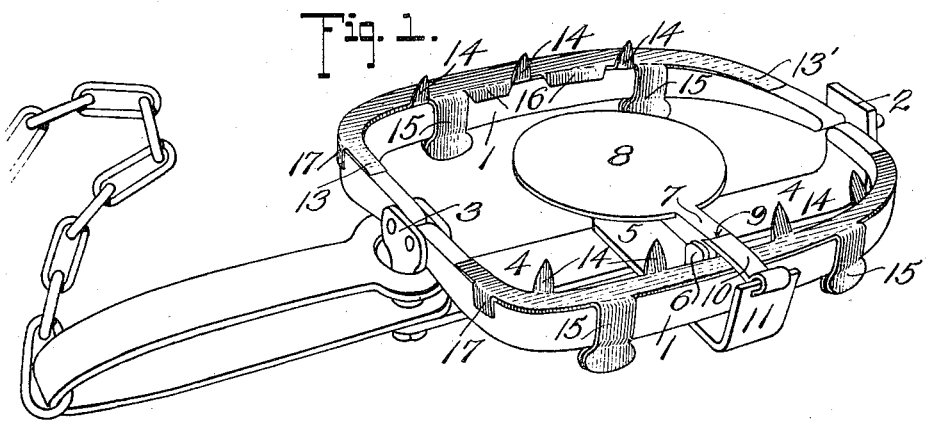
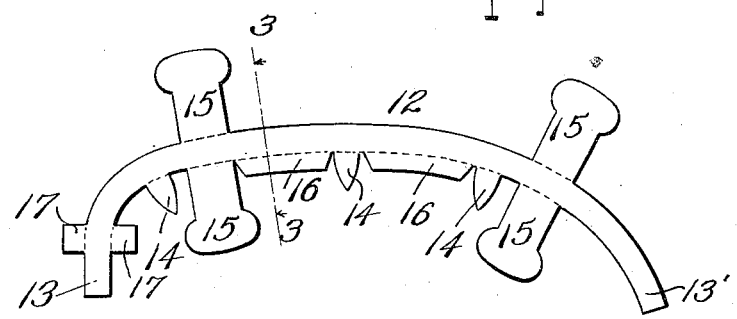
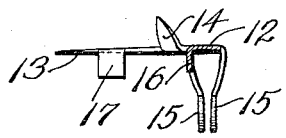
Inventor
Frank Drake
Witnesses

UNITED STATES PATENT OFFICE.

FRANK DRAKE, OF ALTAMONT, SOUTH DAKOTA.

REMOVABLE TRAP-TEETH.

1,052,326.  Specification of Letters Patent.  Patented Feb. 4, 1913.

Application filed March 15, 1912. Serial No. 683,932.

*To all whom it may concern:*

Be it known that I, FRANK DRAKE, a citizen of the United States, residing at Altamont, in the county of Deuel and State of South Dakota, have invented certain new and useful Improvements in Removable Trap-Teeth, of which the following is a specification.

The present invention relates to removable teeth for animal traps, and particularly consists of a device embodying teeth which may be applied to those forms of animal traps not ordinarily provided with teeth.

The particular form of trap to which my invention is applied, consists of two jaws, provided with spring mechanism to press the jaws together, a support on which the jaws are mounted, and a pivoted pan arranged on the said support, said pan being provided with an arm having a shoulder to engage a trigger which maintains the two jaws in a position some distance from each other. Usually only the large size traps are provided with integrally formed teeth, but in many instances these large size traps are impracticable for catching certain animals, and it is necessary for the trapper to have recourse to the smaller size traps.

The invention accordingly consists of a structure which may be stamped out of a single piece of metal, and so formed as to have portions which will serve as teeth, a main body portion which will correspond in contour to the shape of one of the jaws of an animal trap such as above described, and portions which will be adapted to fasten the structure to the jaw of the animal trap.

The device is so made as to be easily applied and removed from the jaw of a trap when desired.

For a full understanding of the present invention, reference is to be had to the following description and the accompanying drawings, in which:

Figure 1 is a perspective view of a well known form of animal trap, shown provided with my improved detachable teeth; Fig. 2 is a plan view of a blank embodying all of the structural details of the present invention, before certain of the operative parts thereof have been bent into position for use on a trap; and Fig. 3 is a sectional view of the detachable teeth showing the same bent into operative position, taken on the line 3—3 of Fig. 2.

Throughout the following detail description and on the several figures of the drawings, similar parts are referred to by like reference characters.

Referring now particularly to the drawings, the reference numeral 1 indicates each of the two jaws of a well known form of animal trap illustrated in Fig. 1, each of the said jaws being pivotally mounted in the arm 2 and bearing 3, which latter are connected with the bed or support 4. The jaws co-act at their pivotal points with the usual form of spring arms adapted to close the jaws, but such structure forms no part of the present invention. Fastened to the bed or support 4 is an additional supporting member 5, preferably extending at substantially right angles to the member 4, and provided with the mechanism by which the jaws are held apart and the ordinary device for releasing the same. This latter mechanism consists of the bearing 6 in which is pivotally mounted an arm 7 connecting with the ordinary pan or disk 8. The arm 7 is provided with a shoulder 9 which is adapted to engage a trigger 10, the latter being pivotally connected to the upturned end 11 of the supporting member 5. It will be obvious that as the trigger 10 is adjusted into position to engage the shoulder 9 referred to, that the jaws 1 will be held apart, and any pressure by the foot or other part of an animal's body upon the disk or pan 8 will cause a depression of the latter with the consequent disengagement of the trigger 10, allowing the jaws 1 to be drawn to their closed position. The foregoing completes the description of the operative parts of an example of a trap to which the specific device forming the present invention may be applied, and I will now proceed to describe such specific device.

The removable trap teeth forming the present invention are preferably stamped in one integral piece from a sheet of metal, and a blank adapted for the purposes of the present invention, having certain portions adapted to be bent into operative position, is shown in Fig. 2. In this figure, 12 indicates the main body of the device all parts of which lie in substantially the same plane, as shown, the same being formed in a somewhat curved shape so as to conform to the curvature of the ordinary form of jaw of an animal trap, and being especially curved at its end portions 13 and 13', which portions are adapted to engage the bends in one of the jaws of an animal trap which are usually situated near the pivotal portions of the jaws. The blank piece of metal is formed with a plurality of projecting teeth 14 which, when the device is to be applied to the trap, will be bent upwardly so as to make an angle of about 120 degrees with the plane of the body portion 12. With the teeth bent into the position described they will be in a position, when the jaws to which the teeth have been applied close, to enter to their fullest depth the flesh of an animal which has been trapped.

The blank is provided with extensions 15, which when the device is to be applied to the jaws of the trap, may be bent vertically downwardly so as to securely hold the device upon the jaw and prevent any possible dislocation thereof by the efforts of the trapped animal. In order to secure a better fastening of the trap teeth to the jaw of the trap, these extensions 15 are formed in pairs oppositely disposed to each other on both sides of the body portion 12.

The blank may, in practice, be made of resilient steel, so that the extensions 15 will have a spring action with relation to the jaw on which the removable teeth are placed and securely clasp the same; or the blank may be made of soft steel so that the extensions 15 may be easily turned up and down as they are taken off or placed on the jaws. The extensions 15 should be formed of sufficient length to extend some distance below the lower side of the jaw, as shown in Fig. 1, so as to be capable of manipulation with the fingers, and the lower ends of two oppositely disposed extensions will be bent inwardly toward each other, as is clearly shown in Fig. 3. Additional flanges or projections 16 are formed in the blank in order to more securely hold the trap teeth on the jaws of the trap, and special end projections 17 are formed at one end of the blank, these being adapted when bent down, to engage at the turn in the jaw in order to prevent lateral movement of the trap teeth on the jaws. The portions 13 and 13' taper to their ends, as is clearly shown in Fig. 1, so as not to interfere with the proper closing of the jaws.

From the foregoing it will be seen that I have provided a device of extremely simple construction and cheap to manufacture, which may be easily applied to the jaws of an animal trap of the class illustrated, and as easily removed therefrom. It must be distinctly understood that I am not limited to the exact form of removable trap teeth shown, as such is only one example of construction of the same, as various modifications may be made in the position and proportions of the parts of the device without departing from the spirit of the invention or sacrificing any of its advantages, so far as the same may come within the scope of the subjoined claims.

Having thus described the invention, what is claimed as new is:

1. In combination with an animal trap provided with a pair of coacting jaws, a teeth-carrying member detachably secured to one of the jaws, said member being formed from a single piece of metal and comprising a main body portion having curved end portions, and substantially corresponding in contour to one of the jaws of the trap, upwardly extended teeth projecting from said body portion, projections adapted to engage the jaw to fasten said member on the same, and lateral projections arranged on the edges of said curved end portions adapted to engage the jaw at a bend and prevent lateral movement of the said member on the jaw.

2. As a new article of manufacture, removable trap teeth adapted to be applied to the jaw of an animal trap, the same comprising a metallic body portion, teeth integrally formed therewith and projecting from the edge of said body portion, integrally formed pairs of oppositely disposed extensions projecting from the edge of said body portion and having portions thereof adapted to be forced in close proximity to each other to hold said body portion on said jaw, additional projections disposed between said pairs of extensions to assist in holding said body portion on said jaw, all parts of said body portion, being curved at its extremity, and projections formed in one of said curved extremities to engage the jaw at a bend thereof in order to prevent lateral displacement of the body portion.

In testimony whereof I affix my signature in presence of two witnesses.

FRANK DRAKE.

Witnesses:
W. F. CARSTENS,
S. R. M. CLARK.

---

Copies of this patent may be obtained for five cents each, by addressing the "Commissioner of Patents, Washington, D. C."